(12) United States Patent
Omeragic

(10) Patent No.: US 6,924,646 B2
(45) Date of Patent: Aug. 2, 2005

(54) SYSTEM AND METHOD FOR LOCATING A FRACTURE IN AN EARTH FORMATION

(75) Inventor: Dzevat Omeragic, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 171 days.

(21) Appl. No.: 10/335,608

(22) Filed: Dec. 31, 2002

(65) Prior Publication Data

US 2004/0124841 A1 Jul. 1, 2004

(51) Int. Cl.[7] ............... G01V 3/18; G01V 3/30
(52) U.S. Cl. ............ 324/338; 324/339; 324/343; 702/7
(58) Field of Search ............. 367/35; 324/338, 324/339, 343

(56) References Cited

U.S. PATENT DOCUMENTS

| | | | |
|---|---|---|---|
| 2,244,484 A | 6/1941 | Beers | |
| 3,187,252 A | 6/1965 | Hungerford | |
| 4,264,862 A | 4/1981 | Koelle et al. | |
| 4,302,723 A | 11/1981 | Moran | |
| 4,360,777 A | * 11/1982 | Segesman | 324/339 |
| 4,636,731 A | 1/1987 | Savage et al. | |
| 4,972,150 A | 11/1990 | Tabbagh | |
| 5,115,198 A | 5/1992 | Gianzero et al. | |
| 5,200,705 A | 4/1993 | Clark et al. | 324/338 |
| 5,530,359 A | 6/1996 | Habashy et al. | |
| 5,615,115 A | 3/1997 | Shilling | |
| 6,044,325 A | 3/2000 | Chakravarthy et al. | |
| 6,181,138 B1 | 1/2001 | Hagiwara et al. | |
| 6,226,595 B1 | 5/2001 | Rossi et al. | 702/10 |
| 6,304,086 B1 | * 10/2001 | Minerbo et al. | 324/338 |
| 6,393,364 B1 | 5/2002 | Gao et al. | |
| 6,476,609 B1 | * 11/2002 | Bittar | 324/338 |

FOREIGN PATENT DOCUMENTS

| | | |
|---|---|---|
| GB | 2066475 A | 7/1981 |
| GB | 2279149 A | 12/1994 |
| WO | WO89/03053 | 4/1989 |
| WO | 02/04987 | 1/2002 |
| WO | WO02/004987 A3 | 1/2002 |

* cited by examiner

Primary Examiner—N. Le
Assistant Examiner—Darrell Kinder
(74) Attorney, Agent, or Firm—Kevin P. McEnaney; Brigiitte L. Echols; John Ryberg

(57) ABSTRACT

The invention relates to techniques for locating and determining the orientation of a fracture in an earth formation. Systems and methods for detecting a fracture in an earth formation using a propagation tool include producing electromagnetic fields using a TMD transmitter in the tool; measuring corresponding voltage signals detected with one or more TMD receivers in the tool; determining harmonics from the measured signal responses by shifting the responses (e.g. by 90 degrees) and performing an addition or subtraction using the shifted response. In some embodiments, the second harmonic is processed to determine the fracture orientation.

38 Claims, 9 Drawing Sheets

SYSTEM AND METHOD FOR LOCATING A FRACTURE IN AN EARTH FORMATION

BACKGROUND OF THE INVENTION

1. Field of the Invention

This invention relates to the field of subsurface exploration and, more particularly, to logging techniques for detecting and locating fractures in earth formations.

2. Description of Related Art

Electromagnetic (EM) logging tools have been employed in the field of subsurface exploration for many years. These logging tools or instruments entail an elongated support equipped with antennas that are operable as sources or sensors. The antennas on these tools are generally formed as loops or coils of conductive wire. In operation, a transmitter antenna is energized by an alternating current to emit EM energy through the borehole fluid ("mud") and into the surrounding formations. The emitted energy interacts with the borehole and formation to produce signals that are detected and measured by one or more receiver antennas. The detected signals reflect the interaction with the mud and the formation. By processing the detected signal data, a log or profile of the formation and/or borehole properties is determined.

Conventional EM logging techniques include "wireline" logging and logging-while-drilling (LWD) or measurement-while-drilling (MWD). Wireline logging entails lowering the instrument into the borehole at the end of an electrical cable to obtain the subsurface measurements as the instrument is moved along the borehole. LWD/MWD entails attaching the instrument disposed in a drill collar to a drilling assembly while a borehole is being drilled through earth formations. A developing method, sometimes referred to as logging-while-tripping (LWT), involves sending a small diameter "run-in" tool through the drill pipe to measure the downhole properties as the drill string is extracted or tripped out of the hole.

A coil or loop-type antenna carrying a current can be represented as a magnetic dipole having a magnetic moment strength proportional to the product of the current and the area encompassed by the coil. The magnetic moment direction can be represented by a vector perpendicular to the plane of the coil. In the case of more complicated coils, which do not lie in a single plane (e.g. saddle coils as described in published U.S. patent application Ser. No. 20010004212 A1, published Jun. 21, 2001), the direction of the dipole moment is given by: $\oint \times dl$ and is perpendicular to the effective area of the coil. This integral relates to the standard definition of a magnetic dipole of a circuit. See J. A. Stratton, ELECTROMAGNETIC THEORY, McGraw Hill, N.Y., 1941, p. 235, FIG. 41. Integration is over the contour that defines the coil, r is the position vector and dl is the differential segment of the contour.

In conventional EM logging tools, the transmitter and receiver antennas are typically mounted with their axes along, or parallel, to the longitudinal axis of the tool. Thus, these instruments are implemented with antennas having longitudinal magnetic dipoles (LMD). An emerging technique in the field of well logging is the use of tools with tilted or transverse antennas, i.e., where the antenna's axis is not parallel to the support axis. These tools are thus implemented with antennas having a transverse or tilted magnetic dipole moment (TMD). One logging tool configuration comprises triaxial antennas, involving three coils with magnetic moments that are not co-planar. The aim of these TMD configurations is to provide EM measurements with directed sensitivity. Logging tools equipped with TMDs are described in U.S. Pat. Nos. 6,044,325, 4,319,191, 5,115,198, 5,508,616, 5,757,191, 5,781,436 and 6,147,496.

EM propagation tools measure the resistivity (or conductivity) of the formation by transmitting radio frequency signals into the formation and using spaced-apart receivers to measure the relative amplitude and phase of the detected EM signals. These tools transmit the EM energy at a frequency in the range of about 0.1 to 10 MHz. A propagation tool typically has two or more receivers disposed at different distances from the transmitter(s). The signals reaching the receivers travel different distances and are attenuated to different extents and are phase-shifted to different extents. In analysis, the detected signals are processed to derive a magnitude ratio (attenuation) and phase difference (phase shift). The attenuation and phase shift of the signals are indicative of the conductivity of the formation. U.S. Pat. Nos. 4,899,112 and 4,968,940 describe conventional propagation tools and signal processing.

In addition to the formation resistivity, identification of subsurface fractures is important in hydrocarbon exploration and production. Fractures are cracks or breakages within the rocks or formations. Fractures can enhance permeability of rocks or earth formations by connecting pores in the formations. Fractures may be filled with formation fluids, either brine or hydrocarbons. If a fracture is filled with hydrocarbons, it will be less conductive, i.e., a resistive fracture. Wells drilled perpendicularly to resistive fractures tend to be more "productive" (i.e., produce lager quantities of hydrocarbons). Thus, the determination of a resistive fracture's orientation may help improve oil and gas production. In addition, the orientation of a fracture provides the direction of principal stress, which affects the stability of the well and it helps in predicting which well trajectory will be the most stable. Knowledge of fracture orientations also aids in the prediction of fracture strengths of the earth formation. Furthermore, the presence of fractures may indicate that the mud weight used for drilling the well is too high so as to cause fracture of the rock.

Methods and systems have been developed for detecting fractures and determining their orientation. For example, U.S. Pat. No. 3,668,619 describes the rotation of a logging tool having a single acoustic transducer that senses the reflected acoustic energy to detect fractures. U.S. Pat. No. 5,121,363 describes a method for locating a subsurface fracture based on an orbital vibrator equipped with two orthogonal motion sensors and an orientation detector. U.S. Pat. No. 4,802,144 uses the measurement of hydraulic impedance to determine fractures. U.S. Pat. No. 2,244,484 measures downhole impedance to locate fractures by determining propagation velocity.

There remains a need for improved techniques for detecting and locating fractures, and for determining their orientations, particularly using propagation-type tools.

SUMMARY OF THE INVENTION

The invention provides a method for locating a fracture in an earth formation using a propagation tool disposed in a borehole traversing the formation, the tool having a longitudinal axis. The method comprises transmitting electromagnetic energy from a transmitter antenna disposed on the propagation tool with its magnetic moment at an angle with respect to the longitudinal tool axis; measuring voltage signals detected at a plurality of receiver antennas disposed on the propagation tool with their axes at an angle with respect to the longitudinal tool axis and oriented in different directions from one another, the voltage signals being related to the transmitted electromagnetic energy; associating the measured voltage signals with a plurality of azimuthal angles; and shifting at least one of the measured voltage signals by a predetermined angle and processing the shifted and unshifted signals to locate the fracture.

The invention provides a system for locating a fracture in an earth formation. The system comprises a propagation tool having a longitudinal axis and adapted for disposal within a borehole traversing the formation; a transmitter antenna disposed on the tool with its magnetic moment at an angle with respect to the tool axis; a plurality of receiver antennas disposed on the tool with their axes at an angle with respect to the tool axis and oriented in different directions from one another, the antennas adapted to detect voltage signals associated with electromagnetic energy transmitted by the transmitter antenna; processing means to measure the voltage signals detected by said receiver antennas; processing means to associate the measured voltage signals with a plurality of azimuthal angles; and processing means to shift at least one of the measured voltage signals by a predetermined angle and to process the shifted and unshifted signals to locate the fracture.

The invention provides a method for locating a fracture in an earth formation penetrated by a borehole. The method comprises moving a propagation tool in the borehole, the tool having a longitudinal axis and including a first transmitter antenna disposed thereon with its magnetic moment at a right angle to the tool axis and a plurality of receiver antennas disposed thereon with their axes at right angles to the tool axis; transmitting electromagnetic energy using the first transmitter antenna; measuring voltage signals detected at the plurality of receiver antennas, the signals being related to the transmitted electromagnetic energy; associating the measured signals with a plurality of azimuthal angles; shifting at least one of the measured signals by a predetermined angle; and locating the fracture using the shifted and unshifted signals.

The invention provides a method for locating a fracture in an earth formation using a logging tool disposed in a borehole traversing the formation, the tool having a longitudinal axis. The method comprises transmitting electromagnetic energy from a transmitter antenna disposed on the tool with its magnetic moment at an angle with respect to the longitudinal tool axis; measuring voltage signals detected with a receiver antenna disposed on the tool with its axis at an angle with respect to the longitudinal tool axis, the voltage signals being related to the transmitted electromagnetic energy; determining a second harmonic associated with the measured voltage signals; and performing a calculation on the second harmonic to locate the fracture.

The invention provides a system for locating a fracture in an earth formation. The system comprises a logging tool having a longitudinal axis and adapted for disposal within a borehole traversing the formation; a transmitter antenna disposed on the tool with its magnetic moment at an angle with respect to the tool axis; a receiver antenna disposed on the tool with its axis at an angle with respect to the tool axis, the antenna adapted to detect voltage signals associated with electromagnetic energy transmitted by the transmitter antenna; processing means to determine a second harmonic associated with voltage signals detected with the receiver antenna; and processing means to perform a calculation on the second harmonic to locate the fracture.

DETAILED DESCRIPTION

Figure 1:
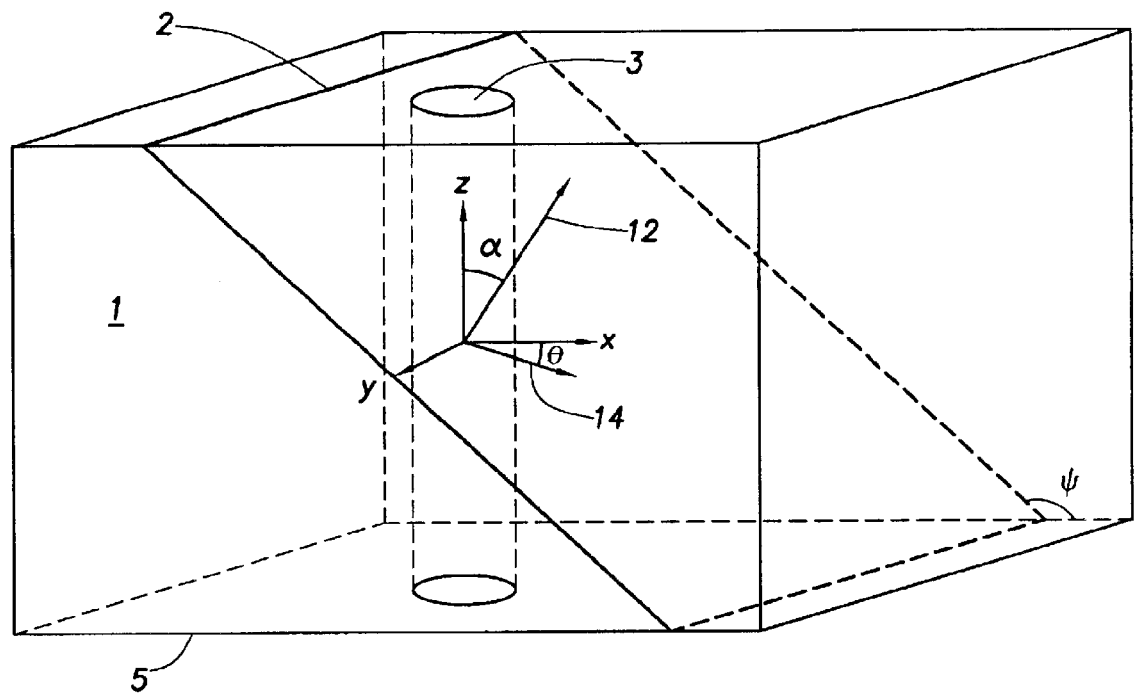
FIG. 1 is perspective view of an earth formation having a fracture and penetrated by a borehole.

In propagation logging, a high-frequency alternating current of constant intensity is sent through the transmitter antenna. The alternating magnetic field created in the transmitter produces currents (eddy currents) in the formation surrounding the borehole. Since the alternating current in the transmitter is of constant frequency and amplitude, the magnitudes of the ground loop currents are directly proportional to the formation conductivity. The voltage detected at the receiver(s) is proportional to the magnitudes of the ground loop currents and, therefore, to the conductivity of the formation.

However, because the currents flow in circular loops coaxial with the transmitter, if a receiver is disposed with its axis in a plane perpendicular to the axis of the transmitter, the eddy currents will not produce any voltage in this receiver. Thus, in the absence of interference from the formation (e.g., in a homogeneous formation), only the receiver having an orientation non-perpendicular to that of the transmitter would receive a voltage. Conventional propagation tools have multiple transmitters and receivers paired up in various orientations. For example, in a triaxial propagation tool, there are three transmitter-receiver antenna pairs arranged at orthogonal orientations. The receiver antennas are generally disposed at a distance from the transmitter antennas. While the orientations of the receiver antennas in a conventional tool typically coincide with those of the transmitter antennas, one skilled in the art would appreciate that one or more receiver antennas may be arranged on the same (or substantially similar) orthogonal axes but point to opposite directions (180° flip) with respect to the corresponding transmitter antennas. In this case, the receivers will register the same magnitudes of voltages but opposite signs. The above description of current flow assumes that the formation is homogeneous isotropic. If the formation is anisotropic, the current flows will be distorted.

Several prior art tools are available for investigating anisotropic or inhomogeneous formations or formation boundaries. For example, U.S. Pat. No. 5,530,359 discloses a logging tool with multiple transmitter and receiver antennas for detecting locations of formation boundaries. U.S. Pat. No. 6,181,138 discloses a logging tool having skewed antennas for directional resistivity measurements for azimuthal proximity detection of bed boundaries. On a related subject, U.S. patent application Ser. No. 10/113,132 filed on Mar. 29, 2002 by Schlumberger Technology Corporation entitled, "Directional Electromagnetic Measurements Insensitive to Dip and Anisotropy", discloses methods for formation logging using propagation tools that are insensitive to formation anisotropy. This application is assigned to the present assignee.

While propagation tools have been used to detect formation resistivity and layering, i.e., dips and boundaries, these tools have not been used to detect fractures. Compared with a formation layer, a formation fracture is very thin. A fracture may have a different physical property from the surrounding formation. In addition, fractures often cut across formation layers. Thus, a fracture creates a boundary/discontinuity in an otherwise homogenous layer. If the fracture is filled with hydrocarbons, which are non-conductive, the fracture acts like an insulating layer and is expected to have a dramatic impact on the measured conductivity.

Embodiments of the invention are applicable to various fractures. A low conductivity fracture distorts, reduces, or interrupts the eddy currents and, therefore, affects the voltages detected by propagation tools. The magnitudes of these effects depend on the distance of the fracture to the tool and its orientation relative to the tool.

FIG. 1 shows a planar fracture 2 embedded diagonally in an earth formation 1. A borehole 3 penetrates the earth formation 1 perpendicularly to the horizontal plane 5 of the earth formation 1. The fracture's orientation is defined by the normal 12 to the fracture's plane. The fracture's normal 12 makes an angle ($\alpha$) with the longitudinal z-axis of the borehole 3. Projection 14 of the fracture's normal 12 onto a plane parallel to the earth formation's horizontal plane 5 is at an angle ($\theta$) with respect to the x-axis. In the art, the inclination of the fracture is usually defined by the fracture dip angle ($\Psi$) subtended by the earth formation's horizontal plane 5 and the fracture plane.

As noted above, oil-filled fractures have dramatic effects on EM measurements. Therefore, a propagation tool with an ability to detect responses in specific orientations (e.g., a triaxial tool having a triaxial transmitter and a triaxial receiver) can detect the presence of fractures and their orientation. The techniques of the invention may be implemented with any propagation tool capable of directional sensing. While this description uses a triaxial propagation tool to illustrate methods of the invention, one skilled in the art would appreciate that other suitable tools (e.g., those having only TMD transmitter and receiver antennas) may be used.

Figure 2:
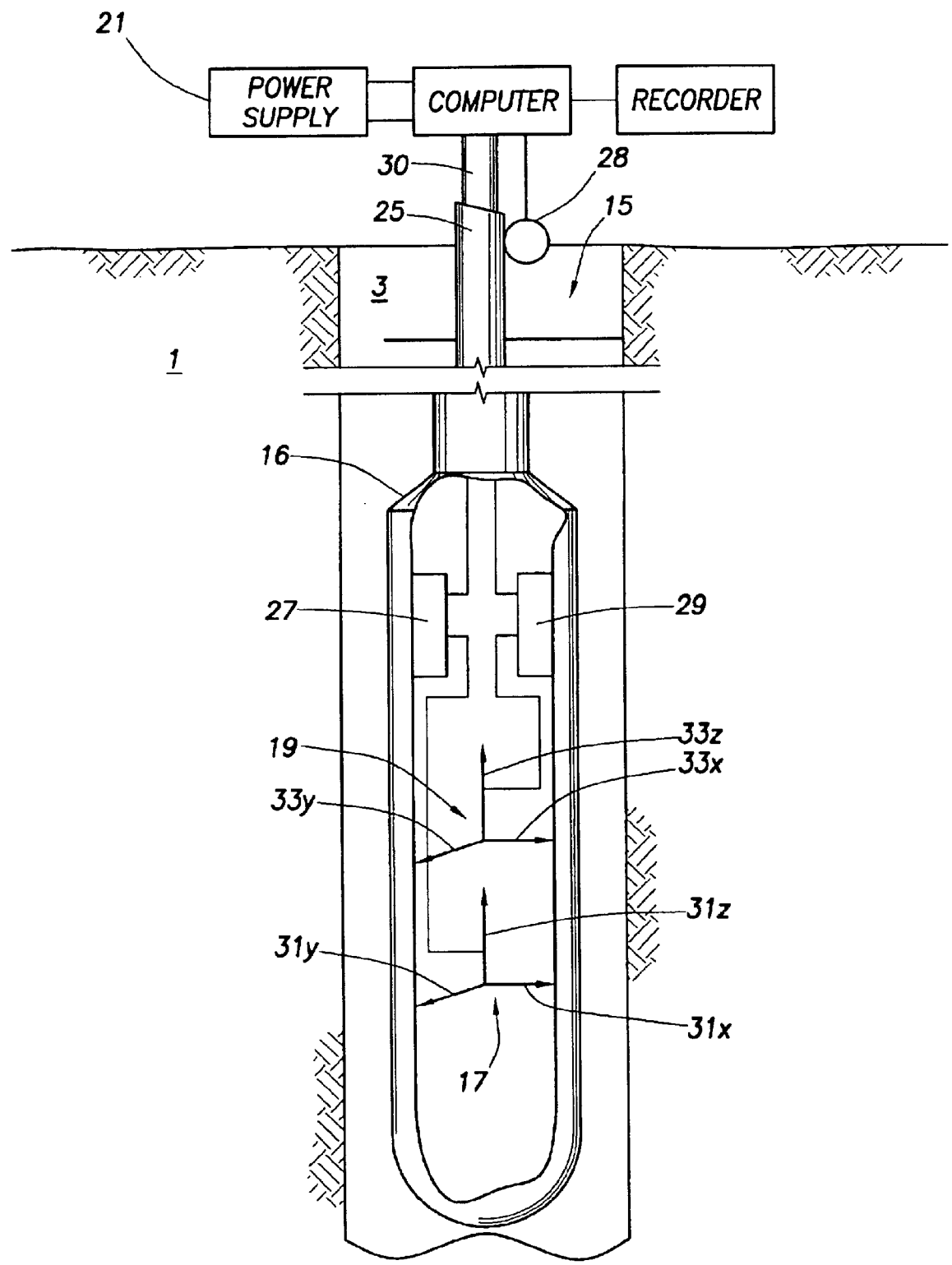
FIG. 2 shows a prior art triaxial electromagnetic logging tool suitable for practicing embodiments of the invention disposed in a borehole.

FIG. 2 shows a downhole logging system 15, which includes a logging tool 16 having a triaxial transmitter 19 and a triaxial receiver 17, disposed in a borehole 3 that penetrates a formation 1. The triaxial receiver 17 is arranged such that its axes or sensing directions ($31_x$, $31_y$, and $31_z$) are substantially parallel with the mutually orthogonal magnetic moments ($33_x$, $33_y$, and $33_z$) of the triaxial transmitter 19. The tool 16 is shown supported in the borehole 3 by a logging cable 25 in the case of a wireline system or a drill string 25 in the case of a LWD/LWT system. With a wireline tool, the tool 16 is raised and lowered in the borehole 3 by a winch 28, which is controlled by the surface equipment 21. Logging cable or drill string 25 includes conductors or telemetry means 30 that link the downhole electronics with the surface equipment 21 as known in the art. Downhole electronics comprise a transmitter circuit 27 and a receiver circuit 29. The transmitter circuit 27 controls current flows through the transmitter antennas ($33_x$, $33_y$, $33_z$) to generate magnetic moments $M_x$, $M_y$, and $M_z$ (not shown). The magnetic moments in turn produce eddy currents that flow in the earth formation 1 surrounding the borehole 3. The eddy currents generate secondary magnetic fields. The receiver circuit 29 detects voltages in the receiver' antennas ($31_x$, $31_y$, $31_z$) that are induced by the secondary magnetic fields. The detected signals are communicated to the surface equipment 21 for processing using known telemetry means. Alternatively, these signals may be processed in the tool 16, and the processed data are then transmitted to the surface. In some embodiments, the propagation tool 16 may include a motor (not shown) to rotate the triaxial transmitter and the triaxial receiver in the azimuthal direction.

The surface equipment 21 may be adapted to process the received voltages as a function of depths and azimuthal angles of the tool 16. The voltages in the receiver antennas ($31_x$, $31_y$, and $31_z$) can be shown as vector voltages, the magnitudes and phases of which depend on the conductivity of the surrounding earth formation 1. The received voltage is usually expressed as a complex signal (phasor voltage).

In a homogeneous formation, the magnetic moments $M_x$, $M_y$ and $M_z$ produced by the triaxial transmitter 19 only produce voltages in the corresponding receivers in the same orientations. That is, when the transmitter in the X-axis is energized, only the receiver aligned in the X direction detects a nonzero voltage. This is indicated as $V_{xx}$. Similarly, when the Y transmitter is energized, only the Y receiver detects a nonzero voltage, $V_{yy}$, and the same is true for the transmitter-receiver pair in the Z direction, $V_{zz}$.

Figure 3:
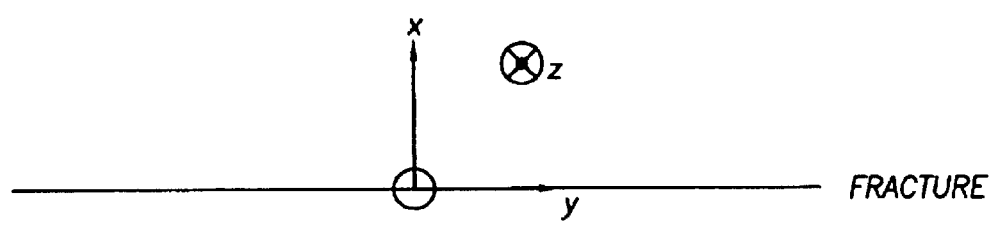
FIG. 3 is a schematic showing a logging tool disposed in a borehole (not shown) with an antenna having its axis aligned with the plane of a fracture.

FIG. 3 illustrates a simple scenario in which the plane of the fracture coincides with a plane defined by two receiver axes (e.g., y-z). If the fracture is filled with a fluid with a lower conductivity (e.g., an oil-filled fracture) than the formation, then the loop currents produced by the X transmitter, which flow in planes parallel to the fracture plane, would not be significantly affected by the presence of the fracture. Consequently, the coupling between the transmitter and receiver in the X direction is substantially unaffected. Thus, the detected $V_{xx}$ is not substantially affected by the fracture. In contrast, the currents produced by the Y or Z transmitters flow in planes perpendicular to the fracture plane and the current loops flow through the fracture. As a result, the detected $V_{yy}$ and $V_{zz}$ voltages will be measurably reduced. However, the cross term voltages (i.e., $V_{xy}$, $V_{yx}$, $V_{xz}$, $V_{zx}$, $V_{yz}$, and $V_{zy}$) remain zero in this scenario because the presence of the fracture only affects the magnitudes of the generated currents but does not skew the current loops.

Figure 4:
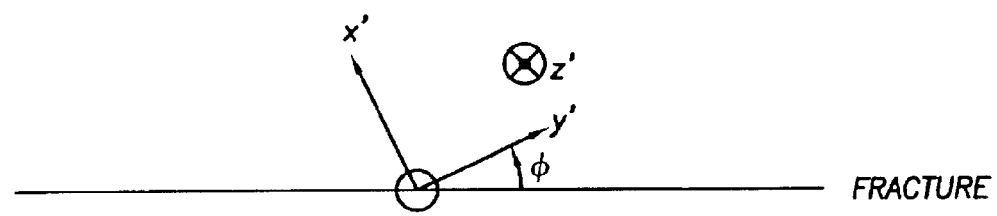
FIG. 4 is a schematic showing the logging tool of FIG. 3 disposed with the antenna axis at an angle ($\phi$) away from the plane of a facture.

FIG. 4 illustrate a scenario in which the plane of the fracture parallels the Z' axis of the tool, but makes an angle ($\phi$) with respect to the Y' axis of the transmitter and receiver. This scenario occurs when a tool is rotated by an angle ($\phi$) from the situation illustrated in FIG. 3. In this second scenario, neither the X' nor the Y' axis of the tool is aligned with the fracture plane. As a result, the EM fields produced by the X' or Y' transmitter will be "distorted" by the presence of the low conductive fracture. Consequently, the cross terms ($V_{xy}$, $V_{yx}$) will not be zero. The magnitudes of these cross terms depend on the angle ($\phi$).

If the tool is rotated as in an LWD/MWD operation, a series of $V_{xx}$, $V_{yy}$, and $V_{xy}$ voltages can be obtained as a function of azimuthal angles ($\phi$). The detected $V_{xx}$, $V_{yy}$, and $V_{xy}$ voltages signal responses will have sinusoidal modulations with respect to ($\phi$).

Figure 5:
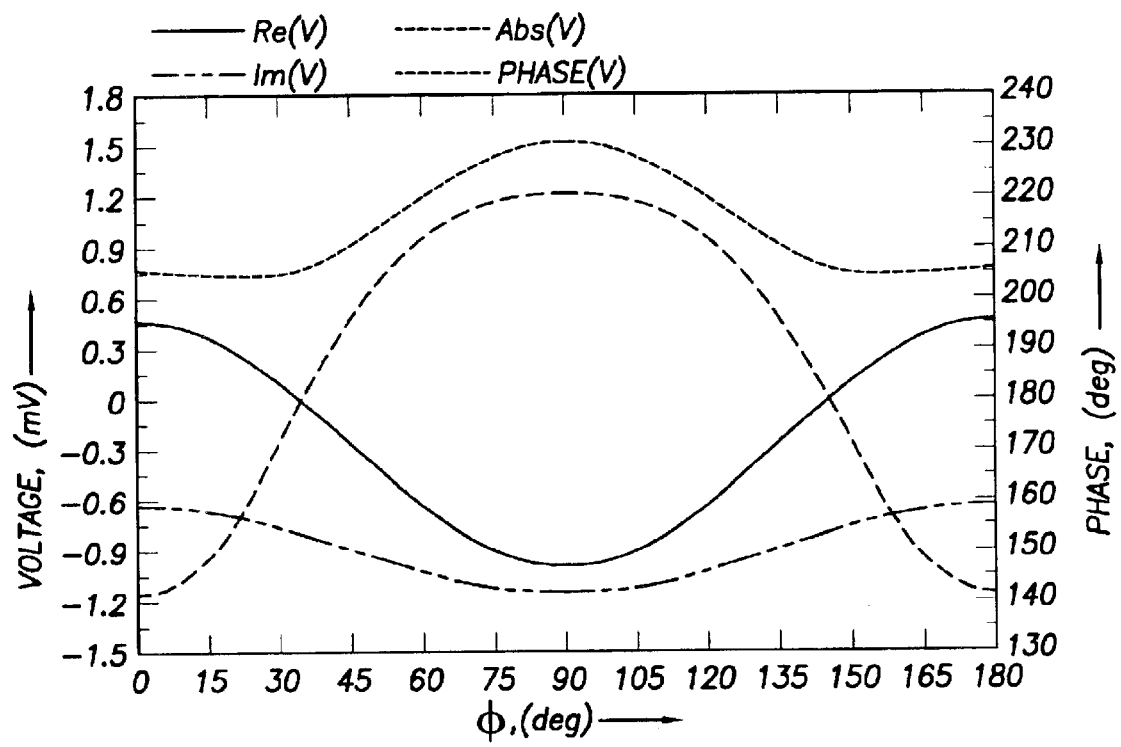
FIG. 5 shows the response (Voltage and Phase) to a fracture as a function of tool orientation with respect to the fracture ($\phi$) measured with a parallel transverse antenna pair according to the invention.

The basic response of a TMD transmitter-receiver antenna pair to a resistive fracture in a 1 Ω-m formation is shown in FIG. 5. The response represents a measurement with the parallel transverse antennas disposed 30 inches (76.2 cm) apart and operating at 2 MHz. The angle ($\phi$) is measured with respect to the fracture, and since this coupling has cos(2$\phi$) sensitivity, responses are shown only in the interval 0–180°. Both the real and imaginary voltage components peak when the antenna's magnetic dipoles are perpendicular to the fracture plane, since the induced loop currents do not cross the fracture in such an orientation. TMD antennas with non-parallel transverse components have similar cos(2$\phi$+$\phi_0$) sensitivity with the phase reference ($\phi_0$) equal to ½ of the angle closed by the transverse components of the TMD antennas.

Figure 6:
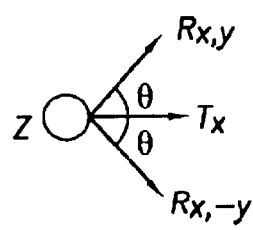
FIG. 6 is a schematic diagram of an antenna configuration with one transmitter and two receivers tilted in the transverse (XY) plane according to an embodiment of the invention.

FIG. 6 shows the building block for propagation directional measurements with quadrant sensitivity according to an embodiment of the invention. The layout is given in the x-y plane. The transmitter antenna $T_x$ and receiver antennas $R_{x,y}$ and $R_{x,-y}$ are spaced apart along the longitudinal tool axis (represented as Z). The receivers $R_{x,y}$ and $R_{x,-y}$ may be collocated using saddle coil antennas or several tilted-coil antennas as know in the art. Alternatively, the invention may be implemented with transverse receivers that are not collocated along the tool axis. FIG. 6 shows the receivers $R_{x,y}$ and $R_{x,-y}$ at +/−45° tilt angles ($\theta$) in the transverse plane with respect to the tool axis Z, but it should be noted that any tilt could be used and the angles do not have to be the same. The transmitter's magnetic dipole moment and the receivers' axes are shown as vector arrows for ease of illustration.

Figure 7A:
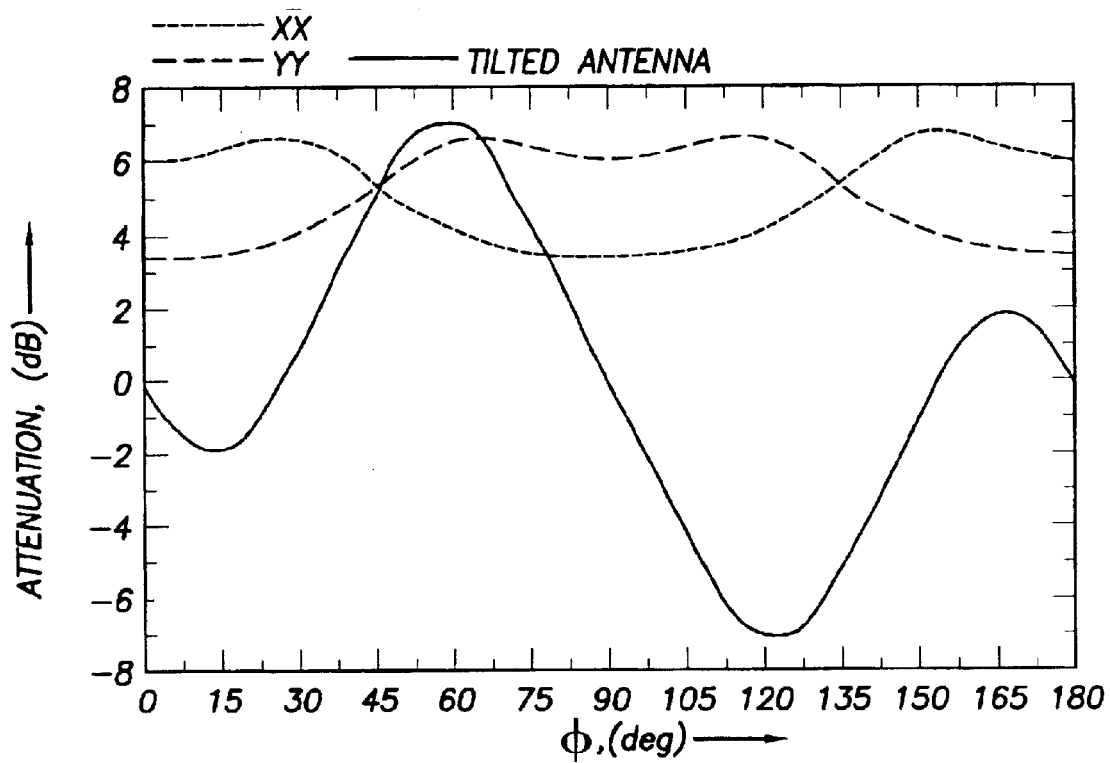
FIG. 7A shows the responses (Attenuation) to a fracture as a function of rotational azimuthal angles detected with a propagation tool according to the invention.
Figure 7B:
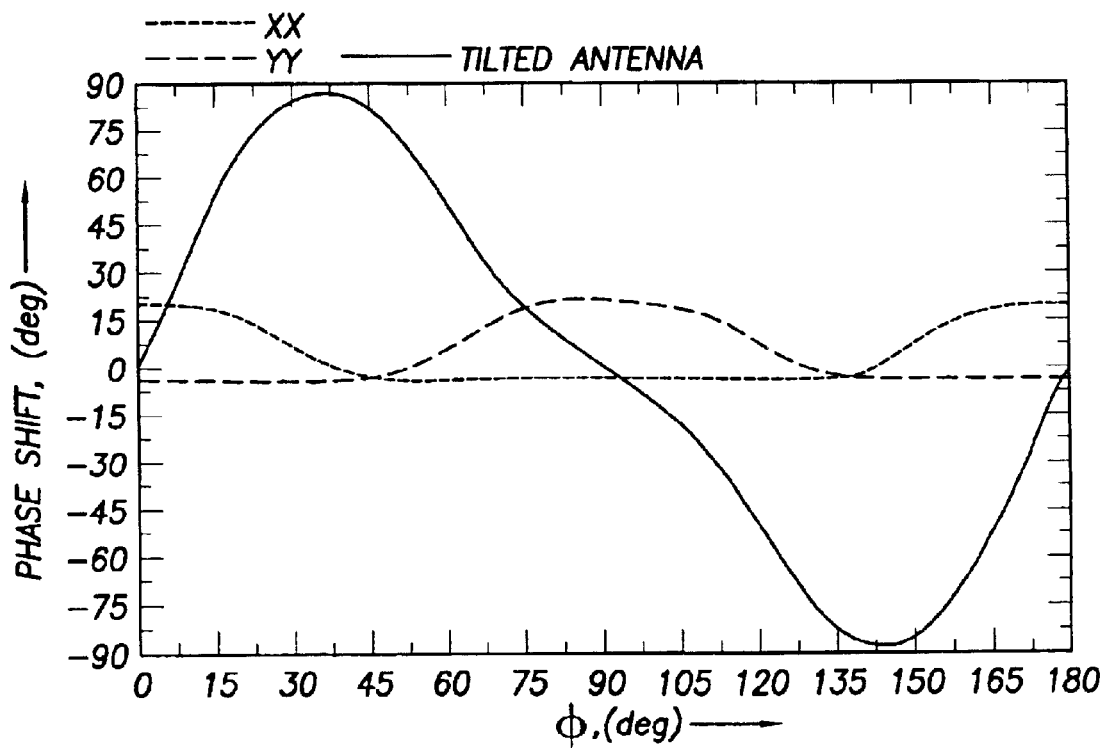
FIG. 7B shows the responses (Phase Shift) to a fracture as a function of rotational azimuthal angles detected with a propagation tool according to the invention.

FIGS. 7A and 7B show the azimuthal dependence (angle $\phi$) of responses to a 1-inch (2.54 cm) resistive fracture in a 1 Ω-m formation obtained with a propagation tool embodiment of the invention. FIG. 7A shows the attenuation and 7B shows the phase shift. These responses were produced using a propagation tool with a transmitter-receiver spacing of 28 inches (71.12 cm), XX and YY receivers spaced at 6 inches (15.24 cm) apart, and at an operating frequency of 2 MHz. The propagation measurement displays cos(2$\phi$) sensitivity with a strong presence of higher order azimuthal dependence of responses. The azimuth $\phi$=0 corresponds to the tool position when the Y antenna is aligned with the fracture as depicted in FIG. 3.

The propagation measurements with antennas tilted in the transverse plane, from FIGS. 7A–7B have responses (solid line) proportional to $$M = \ln\frac{V_{x,y}}{V_{x,-y}} = \ln\frac{V_{xx}+V_{xy}}{V_{xx}-V_{xy}} = \ln\left(1+\frac{2V_{xy}}{V_{xx}-V_{xy}}\right) \cong \frac{2V_{xy}}{V_{xx}}, \quad (1)$$

where the real part of the measurement M is proportional to attenuation and imaginary part is proportional to the phase shift. It should noted that $V_{xx}$ in the denominator has the cos(2$\phi$) dependence which causes appearance of cos(4$\phi$), besides the cos(2$\phi$) azimuthal variation in the responses that is observed in FIGS. 7A–7B.

Figure 8A:
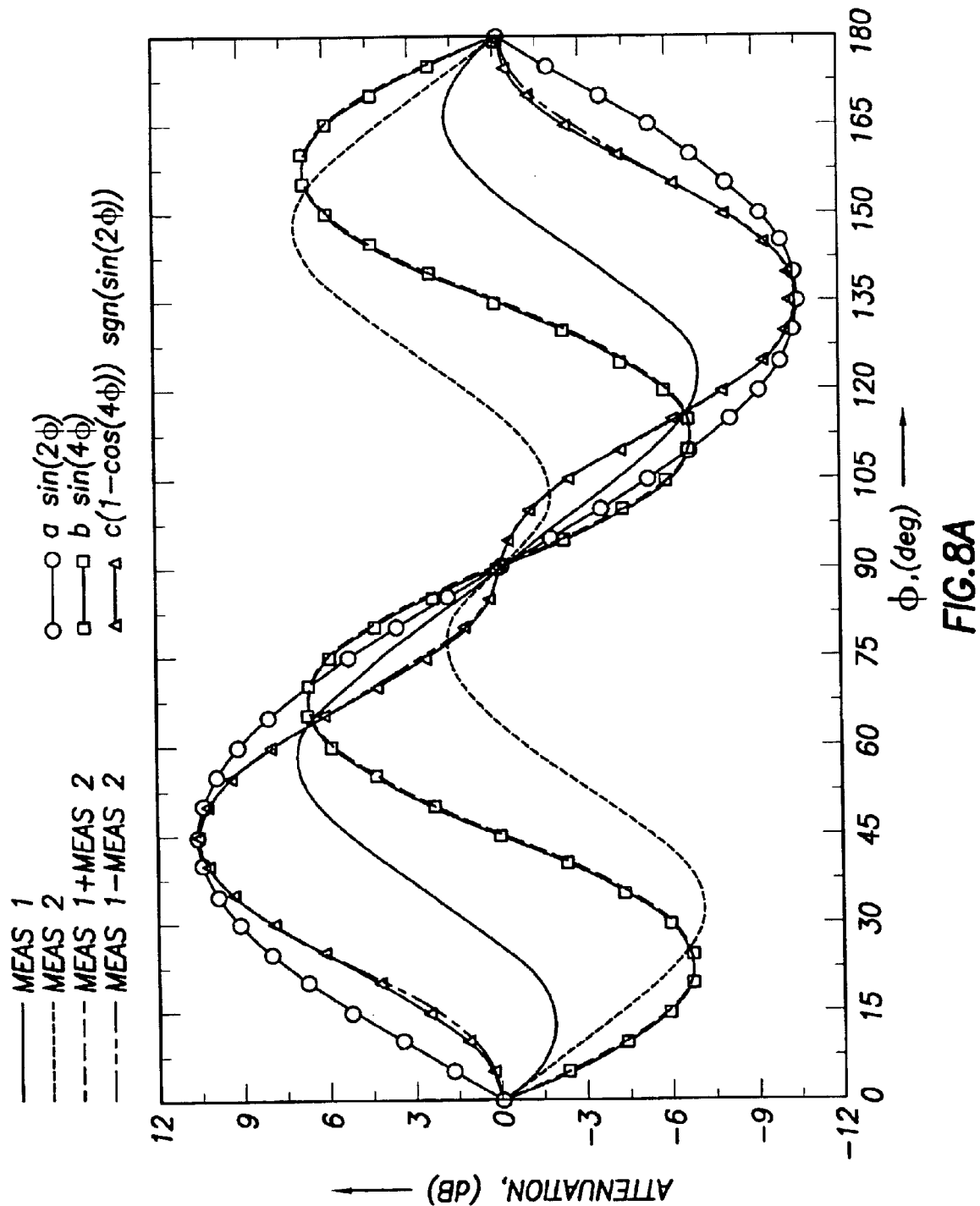
FIG. 8A shows the responses (Attenuation) to a fracture as a function of rotational azimuthal angles detected with a propagation tool according to the invention.
Figure 8B:
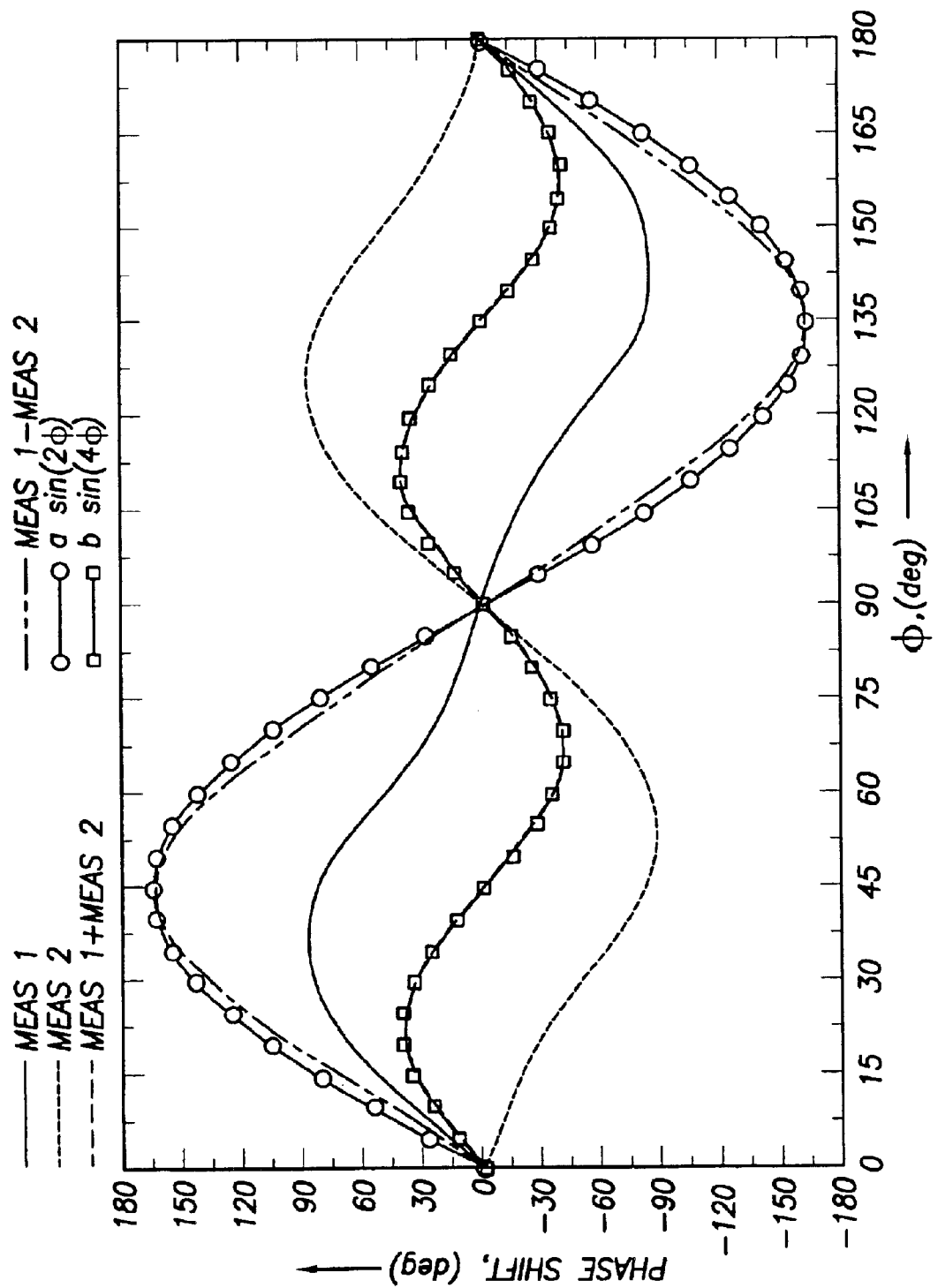
FIG. 8B shows the responses (Phase Shift) to a fracture as a function of rotational azimuthal angles detected with a propagation tool according to the invention.

A way of extracting the responses with cos(2$\phi$) and cos(4$\phi$) azimuthal dependence from measurements with antenna configurations similar to that of FIG. 6 is presented in FIGS. 8A (Attenuation) and 8B (Phase Shift). FIGS. 8A–8B show responses to a 1 inch (2.54 cm) resistive fracture in a 1 Ω-m formation using a transmitter-receiver spacing of 28 inches (71.12 cm) and an operating frequency of 2 MHz. This embodiment of the invention combines the original measurement, noted as "meas 1", with "meas 2", which is "meas 1" shifted 90°. The sum "meas 1+meas 2" has cos(4$\phi$) dependence in both attenuation and phase shift, while the difference "meas 1−meas 2" has c(1−cos(4$\phi$)) sgn(sin(2$\phi$)) dependence in attenuation and very close to cos(2$\phi$) dependence of phase shift. Tool orientations where differential measurement "meas 1−meas 2" is maximal are close to a 45° angle with the fracture. The azimuth $\phi$=0 corresponds to the tool position when the X antenna is aligned with the fracture.

Figure 9:
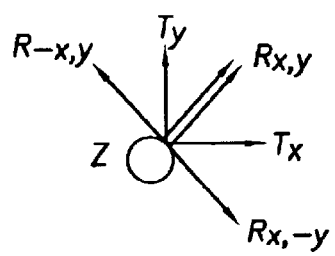
FIG. 9 is a schematic diagram of an antenna configuration with two transmitters and four receivers tilted in the transverse (XY) plane according to an embodiment of the invention.
Figure 10:
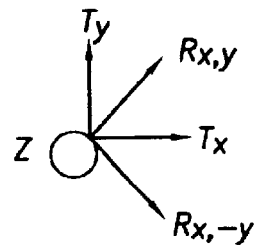
FIG. 10 is a schematic diagram of an antenna configuration with two transmitters and two receivers tilted in the transverse (XY) plane according to an embodiment of the invention.

The same responses from FIGS. 8A and 8B can be obtained using the embodiments of the invention shown in FIGS. 9 and 10. Both alternative configurations use the concept of FIG. 6. The tool of FIG. 9 combines the responses of <$T_x$, $R_{x,-y}$, $R_{x,y}$> (meas 1) with <$T_y$, $R_{x,y}$, $R_{x,y}$> (meas 2). The tool of FIG. 10 measures attenuation and phase shift from transmitters $T_x$ and $T_y$ separately. The phase shift measured with the tool of FIG. 10 is 180° from the measurement with the tool of FIG. 9.

Figure 11:
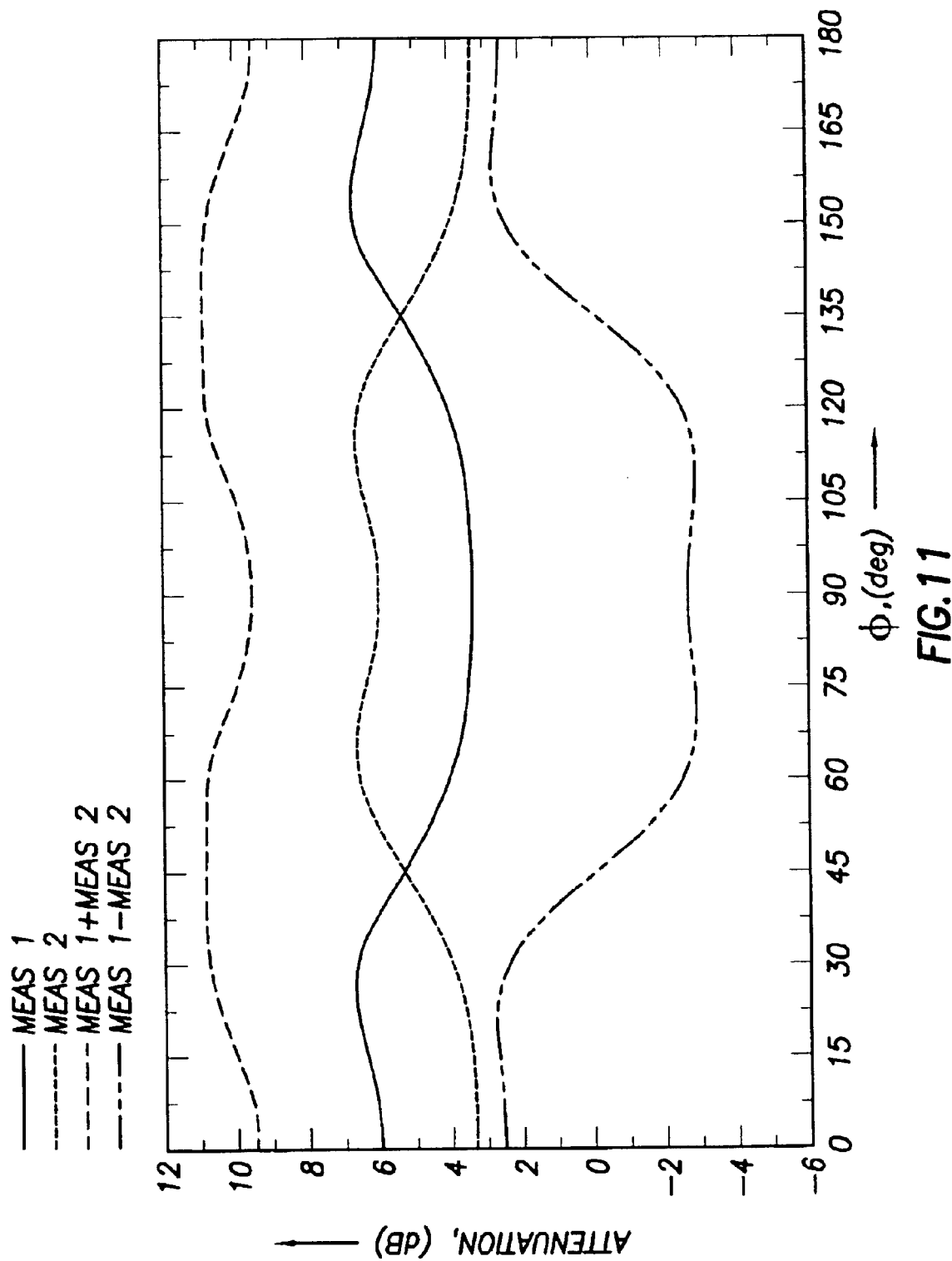
FIG. 11 shows the responses (Attenuation) to a fracture as a function of rotational azimuthal angles detected with a TMD propagation tool according to the invention.
Figure 12:
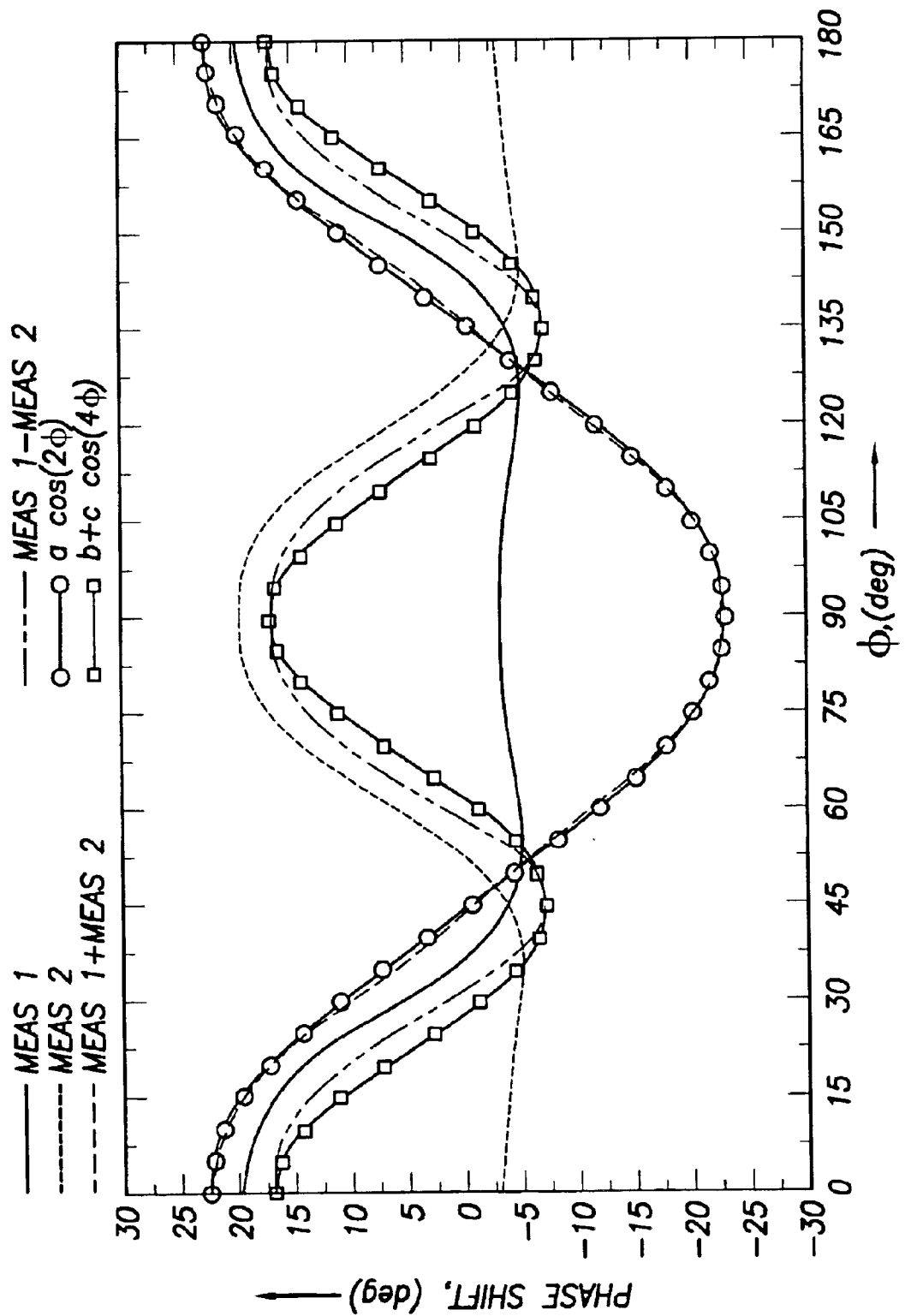
FIG. 12 shows the responses (Phase Shift) to a fracture as a function of rotational azimuthal angles detected with a TMD propagation tool according to the invention.

Another embodiment of the invention uses the TMD propagation measurements (XX and YY) to get responses with cos(2$\phi$) and cos(4$\phi$) dependence. Results from these measurements are presented in FIG. 11 (Attenuation) and FIG. 12 (Phase Shift). These responses are to a 1-inch (2.54 cm) resistive fracture in a 1 Ω-m formation using a transmitter-receiver spacing of 28 inches (71.12 cm) and an operating frequency of 2 MHz. The XX measurement is "meas 1", and "meas 2" is "meas 1" shifted 90 degrees (YY). The sum and difference attenuation responses include cos(4$\phi$) and cos(2$\phi$) dependence (FIG. 11). On the other hand, the phase shift responses and the sum "meas 1+meas 2" response have cos(2$\phi$) dependence and the difference "meas 1−meas 2" has close to cos(4$\phi$) dependence. Fracture orientation is at azimuth when "meas 1+meas 2" is maximal. The azimuth $\phi$=0 corresponds to the tool position when the X antenna is aligned with the fracture.

Figure 13:
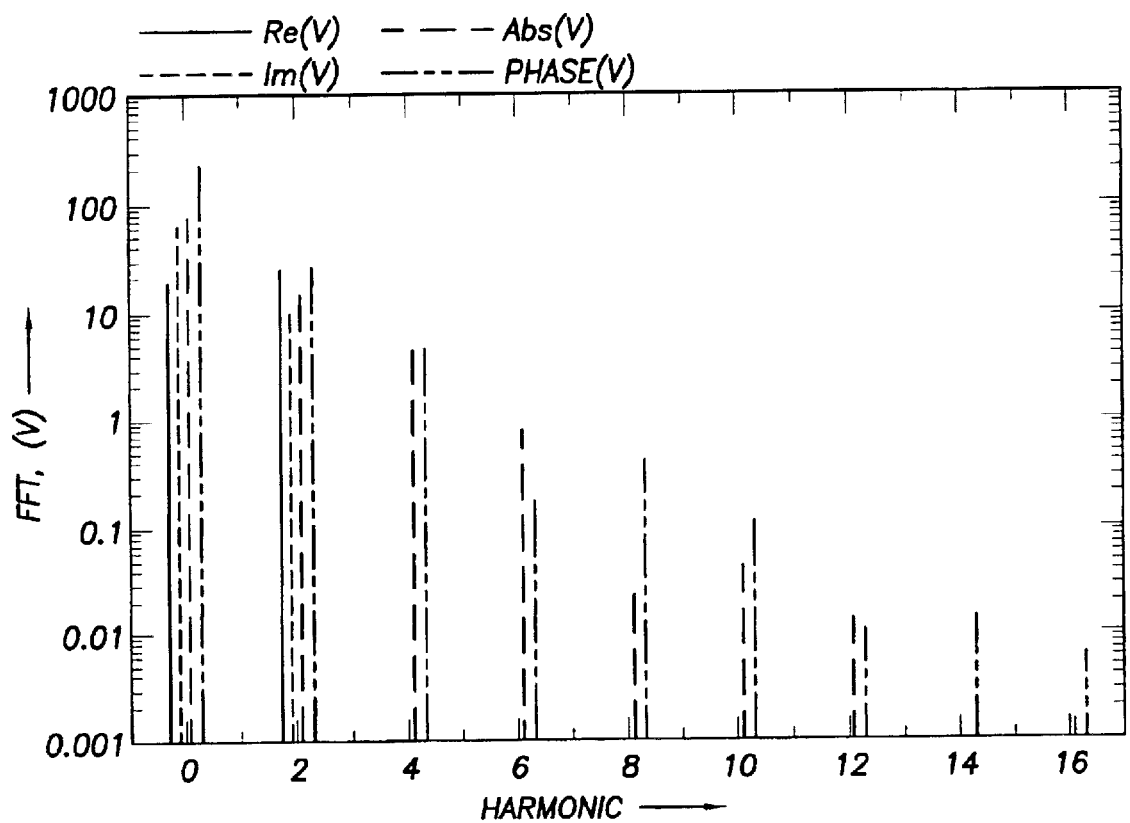
FIG. 13 shows the voltage harmonics corresponding to the response from FIG. 5.

Another aspect of the invention applies harmonic analysis to TMD antenna configurations that entail transverse components. Although the raw voltage response of TMD antennas to a resistive fracture has cos(2$\phi$) sensitivity, the voltage magnitude and phase have higher harmonics. The harmonic content for the signals from FIG. 5 is shown in FIG. 13. By monitoring the second harmonic of the voltage signal, one can estimate the fracture orientation knowing that the signal is maximal when the antennas are not aligned with the fracture. The effects of borehole eccentering as well as nearby boundaries can cause the appearance of a second harmonic. However, the second harmonic due to fractures is typically more significant. Measurements from other couplings (e.g. axial and cross-dipole measurements) may be used to remove or correct for ambiguity in defining the fracture orientation.

For a given channel (frequency f, transmitter t, receiver r) voltage measurement, a fitting algorithm (FFT) will produce coefficients $a_{RE\,i}$, $b_{RE\,i}$, $a_{IM\,i}$, $b_{IM\,i}$:

$$Re\{V(f,t,r)\} = a_{RE0} + \sum_{k=1}^{N} \{a_{REk}\cos(k\phi) + b_{REk}\sin(k\phi)\}$$

$$Im\{V(f,t,r)\} = a_{IM0} + \sum_{k=1}^{N} \{a_{IMk}\cos(k\phi) + b_{IMk}\sin(k\phi)\},$$

where $\phi$ is the angle with respect to the reference antenna orientation. The $\tan^{-1}$ of the second harmonic coefficient ratio is determined by the fracture orientation. The fracture orientation can be obtained by averaging the value from the real (Re) and imaginary (Im) part of the voltage second harmonic:

$$\phi_{frac}(f,t,r) = \frac{1}{4}\left(\tan^{-1}\frac{b_{RE2}}{a_{RE2}} + \tan^{-1}\frac{b_{IM2}}{a_{IM2}}\right). \quad (3)$$

Note that for each individual component, there is ½ in front of $\tan^{-1}$ because the second harmonic is used. Though the previous description focused on the basic antenna pair configuration, it should be understood that the present invention is not limited to the use of any particular number of antennas or antenna pairings.

When using a plurality of antennas, a summation is performed and averaged to obtain the fracture orientation:

$$\frac{1}{N_{rec}}\sum_{i=1}^{N_{rec}} \phi_{frac}(f,t,ri), \quad (4)$$

where (f, t, ri) corresponds to a measurement at the ith receiver antenna and $N_{rec}$ is the number of receiver antennas.

The fracture orientation can also be determined, using Equation (3), from the couplings between a TMD transmitter and two TMD receivers (such as shown in FIG. 6) by averaging the couplings as follows:

$$½\{\phi_{frac}(f,t,r1)+\phi_{frac}(f,t,r2)\}, \quad (5)$$

where (f, t, r1) corresponds to the measurement at one receiver and (f, t, r2) to that at the other receiver. Extension to more receivers is straightforward. In this embodiment, the harmonic fitting is performed after the voltage signals are measured.

Figure 14A:
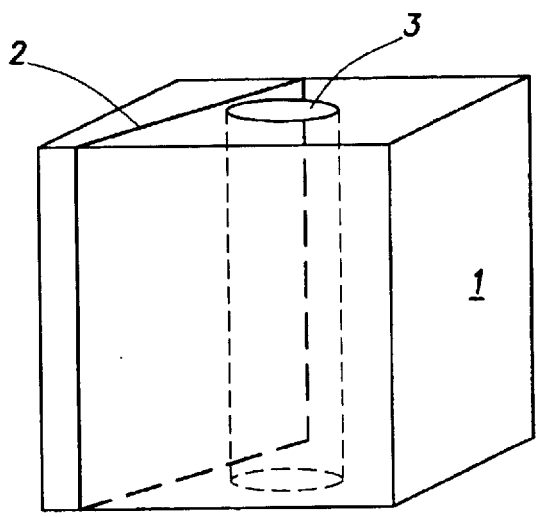
FIG. 14A shows a perspective view of a formation having a borehole and a fracture disposed at a distance from the borehole.
Figure 14B:
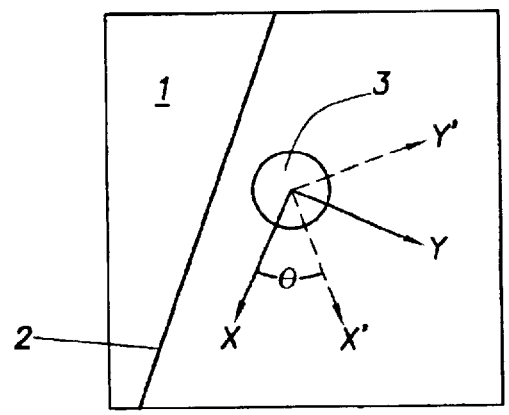
FIG. 14B shows a top view of the formation in FIG. 14A.

For simplicity, the above analysis was shown with the plane of the fracture cutting through the borehole. Similar results are obtained if the plane of the fracture parallels the Z axis but is disposed at a distance from the borehole as shown in FIGS. 14A and 14B. FIG. 14A shows a perspective view of a fracture 2 cutting through an earth formation 1 such that the longitudinal axis of the borehole 3 parallels the fracture plane. FIG. 14B shows a top view of the fracture 2 and the borehole 3 shown in FIG. 14A.

In this case, the angular dependence of the cross term voltages, $V_{xy}$ and $V_{yx}$, remains the same. However, the magnitudes of angular modulations on various terms, $V_{xx}$, $V_{yy}$, $V_{zz}$, $V_{xy}$, and $V_{yx}$, will be smaller because the effects of the fracture are more remote. In fact, the magnitudes of angular modulations in such measurements may be used to predict the distance between the fracture plane and the borehole. If several such measurements are obtained as a function of axial depth, the distances between the fracture plane and the borehole at various axial depths may be used to determine the tilt of the fracture plane relative to the Z-axis.

It will be apparent to those skilled in the art that this invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art.

Advantages of the present invention include convenient techniques for detecting the presence and orientation of formation fractures. It will be appreciated by those skilled in the art that the methods of the invention may be used with a wireline tool, an LWD/MWD tool, or an LWT tool. It will also be appreciated that the antennas used to implement the invention may be constructed using any techniques known in the art. For the purposes of this specification it will be clearly understood that the word "comprising" means "including but not limited to", and that the word "comprises" has a corresponding meaning.

What is claimed is:

1. A method for locating a fracture in an earth formation using a propagation tool disposed in a borehole traversing the formation, the tool having a longitudinal axis, comprising:
    (a) transmitting electromagnetic energy from a transmitter antenna disposed on the propagation tool with its magnetic moment at an angle with respect to the longitudinal tool axis;
    (b) measuring voltage signals detected at a plurality of receiver antennas disposed on the propagation tool with their axes at an angle with respect to the longitudinal tool axis and oriented in different directions from one another, the voltage signals being related to the transmitted electromagnetic energy;
    (c) associating the measured voltage signals with a plurality of azimuthal angles measured circumferentially about the longitudinal tool axis; and
    (d) shifting at least one of the azimuthal angles associated with at least one of the measured voltage signals by a predetermined angle and processing the shifted and unshifted signals to locate the fracture.

2. The method of claim 1, wherein the measured voltage signals relate to a phase difference or a magnitude ratio of the signals detected by said receiver antennas.

3. The method of claim 2, wherein step (d) includes determining signal harmonics from the measured voltage signals.

4. The method of claim 3, wherein step (d) includes performing a subtraction or addition between the shifted and unshifted signals.

5. The method of claim 4, wherein step (d) includes shifting at least one of the measured signals by 90 degrees.

6. The method of claim 4, wherein the transmitter antenna is disposed on the tool with its magnetic moment oriented in a transverse plane with respect to the longitudinal tool axis.

7. The method of claim 4, wherein a first pair of receiver antennas are disposed on the tool with their axes projected in a transverse plane with respect to the longitudinal tool axis and orientated in different directions from one another.

8. The method of claim 7, wherein the transmitter antenna is disposed on the tool with its magnetic moment oriented in a transverse plane with respect to the longitudinal tool axis.

9. The method of claim 8, wherein step (d) includes determining an orientation of the fracture relative to an axis of an antenna disposed on the tool.

10. The method of claim 9, wherein step (d) includes shifting at least one of the measured signals by 90 degrees.

11. The method of claim 8, wherein the tool comprises a second transmitter antenna disposed thereon with its magnetic moment oriented at an angle with respect to the longitudinal tool axis and perpendicular to the magnetic moment of the first transmitter antenna.

12. The method of claim 11, wherein step (b) comprises measuring the voltage signals corresponding to the electromagnetic energy transmitted from the first and second transmitter antennas at the first pair of receiver antennas.

13. The method of claim 12, wherein step (d) includes determining an orientation of the fracture relative to an axis of an antenna disposed on the tool.

14. The method of claim 11, wherein a second pair of receiver antennas are disposed on the tool with their axes projected in a transverse plane with respect to the longitudinal tool axis and oriented in different directions from one another.

15. The method of claim 14, wherein step (b) comprises measuring the voltage signals corresponding to the electromagnetic energy transmitted from the first and second transmitter antennas at the first and second pair of receiver antennas.

16. The method of claim 4, wherein step (b) comprises measuring a voltage signal detected at a receiver antenna disposed on the tool with its axis parallel to and substantially aligned with the magnetic moment of the transmitter antenna.

17. The method of claim 16, wherein the parallel and aligned transmitter and receiver antennas are oriented in an X-coordinate direction or in a Y-coordinate direction.

18. The method of claim 17, wherein step (d) includes determining an orientation of the fracture relative to an axis of an antenna disposed on the tool.

19. A system for locating a fracture in an earth formation comprising:
a propagation tool having a longitudinal axis and adapted for disposal within a borehole traversing the formation;
a transmitter antenna disposed on the tool with its magnetic moment at an angle with respect to the tool axis;
a plurality of receiver antennas disposed on the tool with their axes at an angle with
processing means to associate the measured voltage signals with a plurality of azimuthal angles measured circumferentially about the longitudinal tool axis; and
processing means to shift at least one of the azimuthal angles associated with at least one of the measured voltage signals by a predetermined angle and to process the shifted and unshifted signals to locate the fracture.

20. The system of claim 19, wherein the processing means to measure the detected voltage signals comprises means to measure a phase difference or a magnitude ratio of the detected voltage signals.

21. The system of claim 20, wherein the processing means to measure the detected voltage signals further comprises means to determine signal harmonics from the detected voltage signals.

22. The system of claim 21, wherein the processing means to process the shifted and unshifted signals comprises means to perform a subtraction or addition between the shifted and unshifted signals.

23. The system of claim 22, wherein the processing means to shift at least one of the measured signals comprises means to shift at least one of the measured signals by 90 degrees.

24. The system of claim 22, wherein the transmitter antenna is disposed on the tool with its magnetic moment oriented in a transverse plane with respect to the longitudinal tool axis.

25. The system of claim 22, the tool comprising a first pair of receiver antennas disposed thereon with their axes projected in a transverse plane with respect to the tool axis and orientated in different directions from one another.

26. The system of claim 25, wherein the transmitter antenna is disposed on the tool with its magnetic moment oriented in a transverse plane with respect to the longitudinal tool axis.

27. The system of claim 26, the tool comprising a second transmitter antenna disposed thereon with its magnetic moment oriented at an angle with respect to the tool axis and perpendicular to the magnetic moment of the first transmitter antenna.

28. The system of claim 27, the tool comprising a second pair of receiver antennas disposed thereon with their axes projected in a transverse plane with respect to the tool axis and oriented in different directions from one another.

29. The system of claim 28, wherein the processing means to process the shifted and unshifted signals comprises means to determine an orientation of the fracture relative to an axis of an antenna disposed on the tool.

30. The system of claim 22, the tool comprising a receiver antenna disposed thereon with its axis parallel to and substantially aligned with the magnetic moment of the transmitter antenna.

31. The system of claim 31, wherein the parallel and aligned transmitter and receiver antennas are oriented in an X-coordinate direction or in a Y-coordinate direction.

32. A method for locating a fracture in an earth formation penetrated by a borehole, comprising:
(a) moving a propagation tool in the borehole, the tool having a longitudinal axis and including a first transmitter antenna disposed thereon with its magnetic moment at a right angle to the tool axis and a plurality of receiver antennas disposed thereon with their axes at right angles to the tool axis;
(b) transmitting electromagnetic energy using the first transmitter antenna;
(c) measuring voltage signals detected at the plurality of receiver antennas, the signals being related to the transmitted electromagnetic energy;
(d) associating the measured signals with a plurality of azimuthal angles measured circumferentially about the longitudinal tool axis;

(e) shifting at least one of the azimuthal angles associated with at least one of the measured signals by a predetermined angle; and (f) locating the fracture using the shifted and unshifted signals.

33. The method of claim 32, wherein step (c) includes measuring a phase difference or a magnitude ratio of the voltage signals detected at a first pair of receiver antennas disposed on the tool with their axes at right angles to one another.

34. The method of claim 33, wherein step (e) includes shifting at least one of the measured signals by 90 degrees and respectively adding or subtracting the shifted signal to or from an unshifted signal.

35. The method of claim 34, wherein step (f) includes determining an orientation of the fracture relative to an axis of an antenna disposed on the tool.

36. The method of claim 35, wherein step (c) includes measuring the voltage signals corresponding to electromagnetic energy transmitted from the first transmitter antenna and from a second transmitter antenna disposed on the tool with its magnetic moment at an angle with respect to the tool axis and perpendicular to the magnetic moment of the first transmitter antenna.

37. The method of claim 36, wherein step (c) includes measuring the voltage signals corresponding to electromagnetic energy transmitted from the first and second transmitter antennas at the first pair of receiver antennas and at a second pair of receiver antennas disposed on the tool with their axes at right angles to one another.

38. The method of claim 35, wherein step (c) includes measuring a voltage signal detected at a receiver antenna oriented in an X-coordinate direction or in a Y-coordinate direction, the measured signal corresponding to electromagnetic energy transmitted from the first transmitter antenna oriented in the same respective direction.

* * * * *